(12) United States Patent
Xie et al.

(10) Patent No.: US 12,256,262 B2
(45) Date of Patent: Mar. 18, 2025

(54) METHODS, APPARATUS AND SYSTEMS FOR DATA MAPPING IN A WIRELESS COMMUNICATION

(71) Applicant: ZTE CORPORATION, Guangdong (CN)

(72) Inventors: Feng Xie, Shenzhen (CN); Liping Wang, Shenzhen (CN); Tao Qi, Shenzhen (CN); Jun Xiong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 130 days.

(21) Appl. No.: 17/376,810

(22) Filed: Jul. 15, 2021

(65) Prior Publication Data

US 2021/0400522 A1 Dec. 23, 2021

Related U.S. Application Data

(63) Continuation of application No. PCT/CN2019/072075, filed on Jan. 17, 2019.

(51) Int. Cl.
*H04W 28/02* (2009.01)
*H04W 80/02* (2009.01)

(52) U.S. Cl.
CPC ... *H04W 28/0263* (2013.01); *H04W 28/0268* (2013.01); *H04W 80/02* (2013.01)

(58) Field of Classification Search
CPC ......... H04W 28/0263; H04W 28/0268; H04W 80/02; H04W 72/1263; H04W 72/1273; H04W 28/02; H04W 28/06; H04W 28/10
See application file for complete search history.

(56) References Cited

U.S. PATENT DOCUMENTS

| 2018/0324631 | A1 | 11/2018 | Jheng et al. | |
| 2020/0287615 | A1* | 9/2020 | Zhu | H04W 40/22 |
| 2021/0204160 | A1* | 7/2021 | Jo | H04W 28/0263 |
| 2021/0211926 | A1* | 7/2021 | Han | H04W 28/0252 |

(Continued)

FOREIGN PATENT DOCUMENTS

| CA | 3030542 A1 | 7/2018 |
| CN | 102439871 A | 5/2012 |

(Continued)

OTHER PUBLICATIONS

3GPP TSG-RAN WG2 #103-Bis; R2-1813883; Source: Samsung Electronics R&D Institute UK; Title: TP for TR 38.874 on L2 structures enabling one-to-one mapping between UE bearers and RLC BH channels, Chengdu, PR China, Oct. 8-12, 2018. (Year: 2018).*

(Continued)

*Primary Examiner* — Mohammed S Chowdhury
(74) *Attorney, Agent, or Firm* — Foley & Lardner LLP

(57) ABSTRACT

Methods, apparatus and systems for data mapping in a wireless communication are disclosed. In one embodiment, a method performed by a wireless communication module is disclosed. The method comprises: scheduling data of at least one data radio bearer (DRB) at a first layer; and performing a mapping between a plurality of Quality of Service (QoS) flows and the at least one DRB at a mapping layer that is the first layer or a second layer immediately above the first layer.

12 Claims, 10 Drawing Sheets

(56) References Cited

U.S. PATENT DOCUMENTS

2021/0297892 A1* 9/2021 Teyeb .................. H04W 40/22

FOREIGN PATENT DOCUMENTS

| CN | 108260162 A | 7/2018 |
|---|---|---|
| WO | WO-2018/174420 A1 | 9/2018 |

OTHER PUBLICATIONS

3GPP TSG-RAN WG2 Meeting #103bis; R2-1815516 ; Source: vivo; Title: Comparison between Bearer Mapping Solutions; Chengdu, China, Oct. 8-12, 2018. (Year: 2018).*

3GPP TSG-RAN WG3 #99; R3-181345; Source: AT&T Title: L2-based multi-hop architecture to support IAB architecture requirements; Athens, Greece, Feb. 26-Mar. 2, 2018. (Year: 2018).*

3GPP TR 38.874 V16.0.0 (Dec. 2018); 3rd Generation Partnership Project; Technical Specification Group Radio Access Network; NR; Study on Integrated Access and Backhaul; (Release 16); (Year: 2018).*

3GPP TSG-RAN WG2#103bis; R2-1815520; Source: Huawei, HiSilicon; Title: IAB bearer mapping decisions; Chengdu, China, Oct. 8-12, 2018 (Year: 2018).*

Ericsson et al., "Way Forward on Bearer Mapping for IAB Network" 3GPP TSG-RAN WG2 Meeting #103bis, R2-1814364, Oct. 12, 2018, Chengdu, P.R. China (7 pages).

Extended European Search Report for EP Appl. No. 19849282.9, dated Jun. 27, 2022 (11 pages).

International Search Report and Written Opinion for PCT Appl. No. PCT/CN2019/072075, dated Nov. 15, 2019 (6 pages).

Nokia et al.: "(TP for SA BL CR) Qos handling for F1" 3GPP TSG-RAN WG3#99; R3-181057; Mar. 2, 2018; Athens, Greece (10 pages).

Zte, "Discussion on QoS and bearer mapping for IAB" 3GPP TSG-RAN WG2 Meeting #102, R2-1807399, May 25, 2018, Busan, Korea (5 pages).

International Search Report and Written Opinion for PCT Appl. No. PCT/CN2019/072075 mailed Nov. 15, 2019 (6 pages).

Nokia, "(TP for SA BL CR) QoS handling for F1", 3GPP TSG-RAN WG3#99, RJ-181057, Athens, Greece, Mar. 2, 2018 (10 pages).

Office Action for CN App. No. 201980089446.7 dated Jun. 28, 2024 (with English translation, 15 pages).

* cited by examiner

METHODS, APPARATUS AND SYSTEMS FOR DATA MAPPING IN A WIRELESS COMMUNICATION

CROSS-REFERENCE TO RELATED APPLICATION

This application claims the benefit of priority under 35 U.S.C. § 120 as a continuation of PCT Patent Application No. PCT/CN2019/072075, filed on Jan. 17, 2019, the disclosure of which is incorporated herein by reference in its entirety.

TECHNICAL FIELD

The disclosure relates generally to wireless communications and, more particularly, to methods, apparatus and systems for data mapping in a wireless communication.

BACKGROUND

With the rapid development of technologies such as various industrial chains, Internet of Things, and artificial intelligence, higher requirements are placed on the new generation of wireless mobile communication technologies. The fourth generation (4G) of wireless mobile communication technology cannot meet the requirements of large capacity, high speed, and multiple connections. In this context, major communication equipment vendors and operators have actively invested in the development of the fifth generation (5G) new radio (NR) wireless communication standard.

In a 5G NR system, the protocol layers are divided into two parts: central unit (CU) and distributed unit (DU). The CU and the DU are connected through an F1 interface. The CU side includes a service data adaptation protocol (SDAP) layer and a packet data convergence protocol (PDCP) layer, and the DU side includes a radio link control (RLC) layer, a medium access control (MAC) layer, and a physical (PHY) layer. The layer 2 (L2) of the NR system user plane includes the SDAP layer, the PDCP layer, the RLC layer, and the MAC layer. The SDAP layer is responsible for the mapping and de-mapping of quality of service (QoS) flows, which is data sent by the core network to the access network, to the data radio bearers (DRBs) and marking the QoS flow identification (QFI) for each uplink or downlink QoS flows packet. The PDCP layer provides header compression and decompression, ciphering and deciphering, integrity protection and verification, and order-preservation functions. The RLC layer provides segmentation, reassembly and automatic repeat request (ARQ) services. The MAC layer provides a mapping from logical channel to transport channel, multiplexing, de-multiplexing, scheduling, priority processing, hybrid ARQ (HARM), concatenation, packing, and unpacking services. This design of L2 QoS architecture in the NR system is inefficient and difficult to meet QoS performance requirements.

Thus, existing systems and methods for data mapping and layer design in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication module is disclosed. The method comprises: scheduling data of at least one data radio bearer (DRB) at a first layer; and performing a mapping between a plurality of Quality of Service (QoS) flows and the at least one DRB at a mapping layer that is the first layer or a second layer immediately above the first layer.

In another embodiment, a method performed by a wireless communication device is disclosed. The method comprises: obtaining scheduling information for at least one data radio bearer (DRB) at a first layer; and performing a mapping between a plurality of Quality of Service (QoS) flows and the at least one DRB at a mapping layer that is the first layer or a second layer immediately above the first layer.

In a different embodiment, a wireless communication module configured to carry out a disclosed method in some embodiment is disclosed. In another embodiment, a wireless communication device configured to carry out a disclosed method in some embodiment is disclosed. In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
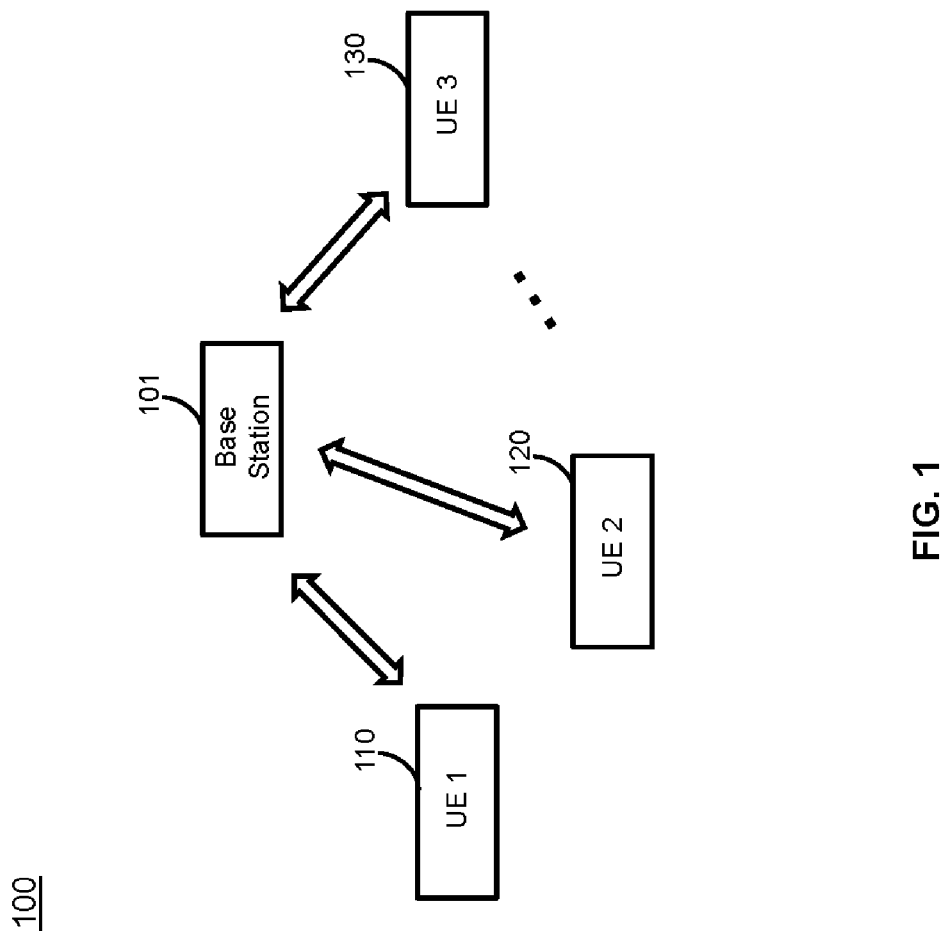
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink (DL) radio frame from the BS to the UE or via an uplink (UL) radio frame from the UE to the BS.

The present teaching discloses a communication system design of layer functions, in a manner that both the control plane function and the data mapping function are closely combined with the transmission scheduling function. In one embodiment, the MAC layer of the protocol stack is responsible for scheduling and concatenating. The MAC+1 layer, which means the layer immediately above the MAC layer, is responsible for mapping between QoS flows and the data bearer DRB. The MAC+2 layer, which means the layer immediately above the MAC+1 layer, is responsible for automatic repeat request (ARQ) functions. The MAC+3 layer, which means the layer immediately above the MAC+2 layer, is responsible for order preservation, robust header compression (RoHC), ciphering, and integrity protection functions.

In another embodiment, the MAC layer of the protocol stack is responsible for data mapping between QoS flows and the data bearer DRB, scheduling, and concatenating functions. The MAC+1 layer is responsible for ARQ function; the MAC+2 layer is responsible for order preservation, RoHC, ciphering, and integrity protection functions. In yet another embodiment, one or more of the functions in the MAC+2 layer above can be moved to the MAC+3 layer.

The present teaching also discloses a method for layer 2 (L2) QoS mapping, wherein a main service and function of a MAC layer or a MAC+1 layer of L2 includes a mapping between QoS flow and DRB. The MAC layer or MAC+1 layer may also mark a QoS flow ID (QFI) for each DL and UL packet. In one example, the network side control plane configures a mapping rule for the mapping between QoS flows and radio bearers to the MAC layer or MAC+1 layer of L2 on the network side. In another example, the network side control plane configures a mapping rule for the mapping between QoS flows and radio bearers to the MAC layer or MAC+1 layer of L2 on the terminal side.

The network side control plane may send an aggregated DRB QoS profile and/or a QoS flow profile to the MAC layer or MAC+1 layer of L2 on the network side for data mapping. The MAC layer or MAC+1 layer of the L2 may reject the aggregated DRB QoS profile indicated by the control plane of the base station. The base station control plane can forward the rejection information to the core network. The data processing granularity at the MAC+2 layer and the MAC+3 layer on the network side and the terminal side includes, but not limited to, QoS flows and protocol data unit (PDU) sessions.

As used herein, the term "layer" refers to an abstraction layer of a layered model, e.g. the open systems interconnection (OSI) model, which partitions a communication system into abstraction layers. A layer serves the next higher layer above it, and is served by the next lower layer below it.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes" or "wireless communication modules"; and a UE may be described herein as non-limiting examples of "wireless communication devices." The BS and UE can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. The BS 101 may transmit downlink data to a UE, e.g. UE 1 110, based on a data mapping function and a scheduling function. These two functions may be integrated closely, in two adjacent layers or in a same layer, to improve QoS performances, which is true for the uplink data transmission as well.

Figure 2:
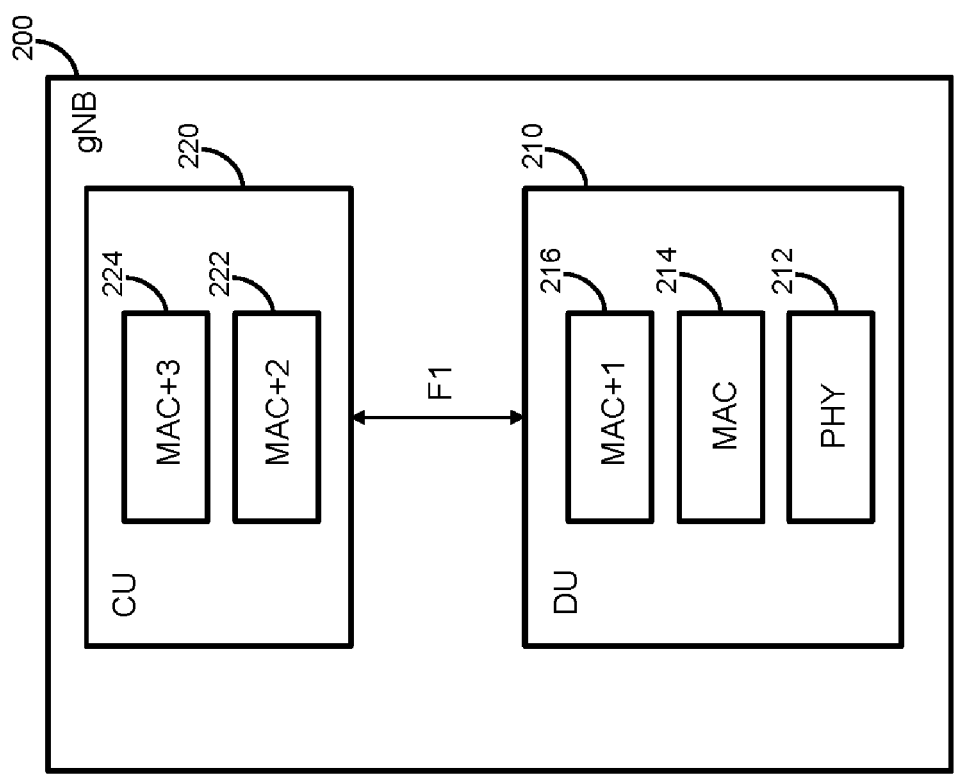
FIG. 2 illustrates an exemplary base station architecture with a separation of central unit and distributed unit, in accordance with some embodiments of the present disclosure.

FIG. 2 illustrates an exemplary architecture of a base station gNB 200 with a separation of central unit (CU) 220 and distributed unit (DU) 210, in accordance with some embodiments of the present disclosure. As shown in FIG. 2, the CU 220 and the DU 210 are connected through an F1 interface. The DU 210 includes a PHY layer 212, a MAC layer 214 above the PHY layer 212, and a MAC+1 layer 216 above the MAC layer 214. The CU 220 includes a MAC+2 layer 222 above the MAC+1 layer 216, and MAC+3 layer 224 above the MAC+2 layer 222. As such, the MAC+2 layer and the MAC+1 layer are deployed separately. In this case, the control plane function may be deployed near the MAC+1 layer or the MAC layer. For example, the control plane function is deployed on the DU 210. Compared to existing NR approach, the mapping function of the QoS flows packet to the DRBs is deployed in the MAC+1 layer or the MAC layer, so that both the control plane function and the mapping function can be closely combined with the MAC layer scheduling function.

Figure 3:
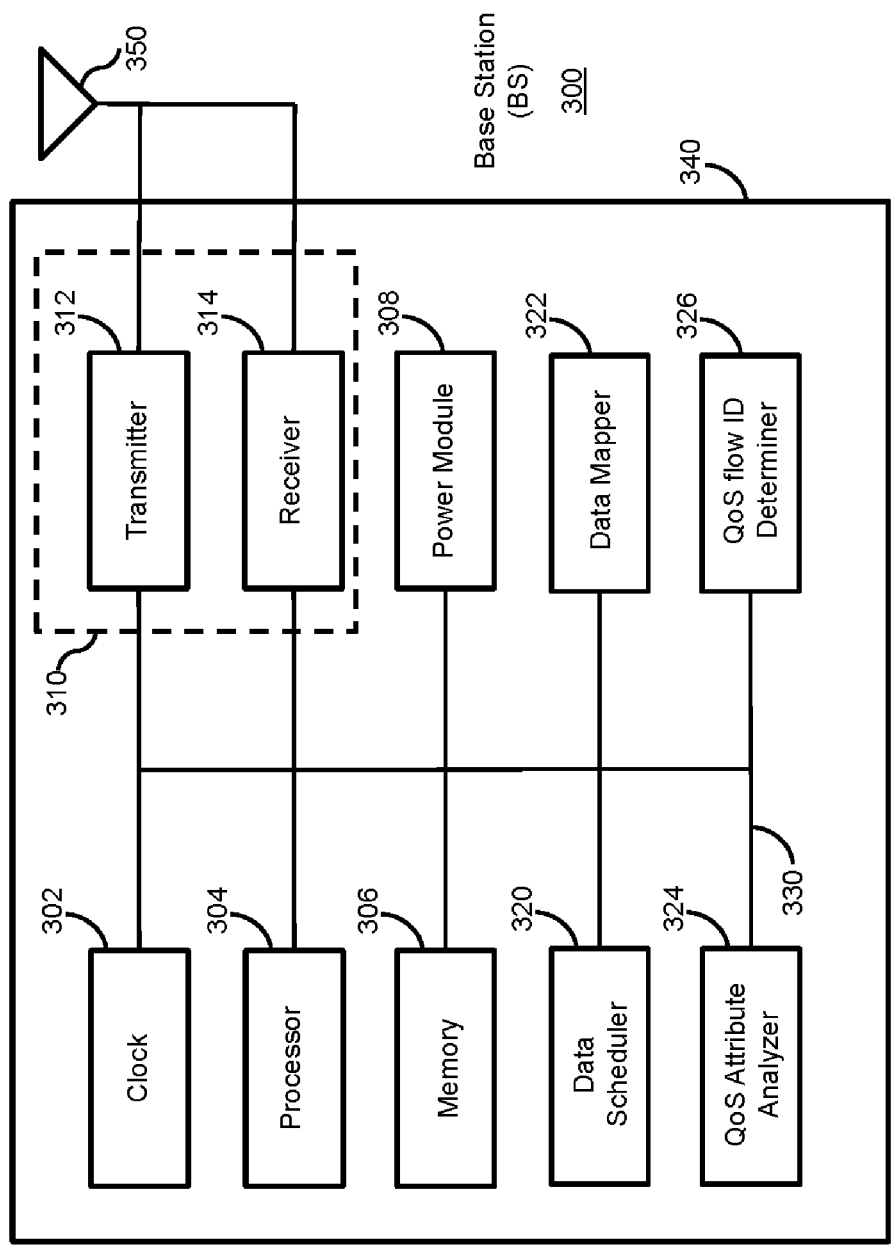
FIG. 3 illustrates a block diagram of a base station (BS), in accordance with some embodiments of the present disclosure.

FIG. 3 illustrates a block diagram of a base station (BS) 300, in accordance with some embodiments of the present disclosure. The BS 300 is an example of a node that can be configured to implement the various methods described herein. As shown in FIG. 3, the BS 300 includes a housing 340 containing a system clock 302, a processor 304, a memory 306, a transceiver 310 comprising a transmitter 312 and receiver 314, a power module 308, a data scheduler 320, a data mapper 322, a QoS attribute analyzer 324, and a QoS flow identification (ID) determiner 326.

In this embodiment, the system clock 302 provides the timing signals to the processor 304 for controlling the timing of all operations of the BS 300. The processor 304 controls the general operation of the BS 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the BS 300 to transmit and receive data to and from a remote device (e.g., another BS or a UE). An antenna 350 is typically attached to the housing 340 and electrically coupled to the transceiver 310. In various embodiments, the BS 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a communication system including the BS 300 that can serve one or more UEs, the BS 300 may transmit downlink data to a UE based on data scheduling. In one embodiment, the data scheduler 320 may schedule data of at least one data radio bearer (DRB) at a first layer, e.g. a medium access control (MAC) layer. The data mapper 322 may perform a mapping between a plurality of Quality of Service (QoS) flows and the at least one DRB at a mapping layer that is the first layer or a second layer immediately above the first layer. For example, the second layer may be a radio link control (RLC) layer. In one embodiment, the first layer and the second layer are implemented at a Distributed Unit (DU) of a split-architecture network; and at least one layer above the second layer is implemented at a Central Unit (CU) of the split-architecture network.

In one embodiment, the QoS attribute analyzer 324 may obtain, at the first layer, QoS attribute information of each QoS flow mapped to the at least one DRB. The QoS attribute information may comprise at least one of: an aggregated DRB QoS profile; a QoS flow profile; and a QoS requirement of each QoS flow mapped to the at least one DRB. The QoS attribute analyzer 324 may send the QoS attribute information to the data scheduler 320, which can schedule the data of the at least one DRB based on the QoS attribute information.

In one embodiment, the data mapper 322 may obtain, at the mapping layer, a mapping rule from a control plane for the mapping between the plurality of QoS flows and the at least one DRB. Based on the mapping rule, the data mapper 322 may map the plurality of QoS flows to the at least one DRB for downlink transmission. The control plane may adjust the mapping rule in real time based on information obtained from the first layer. The information may be related to resource usage and air interface transmission. For example, the information is related to at least one of: an actual air interface transmission efficiency; a physical resource utilization rate; and a scheduling efficiency of the first layer.

In one embodiment, the QoS flow ID determiner 326 may determine and mark an identification (ID) for each of the plurality of QoS flows at the mapping layer. The processor 304 in this example may process data at a layer above the second layer with a granularity of at least one of: a QoS flow and a protocol data unit (PDU) session.

The power module 308 can include a power source such as one or more batteries, and a power regulator, to provide regulated power to each of the above-described modules in FIG. 3. In some embodiments, if the BS 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the BS 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the data mapper 322. Conversely, each of the modules illustrated in FIG. 3 can be implemented using a plurality of separate components or elements.

Figure 4:
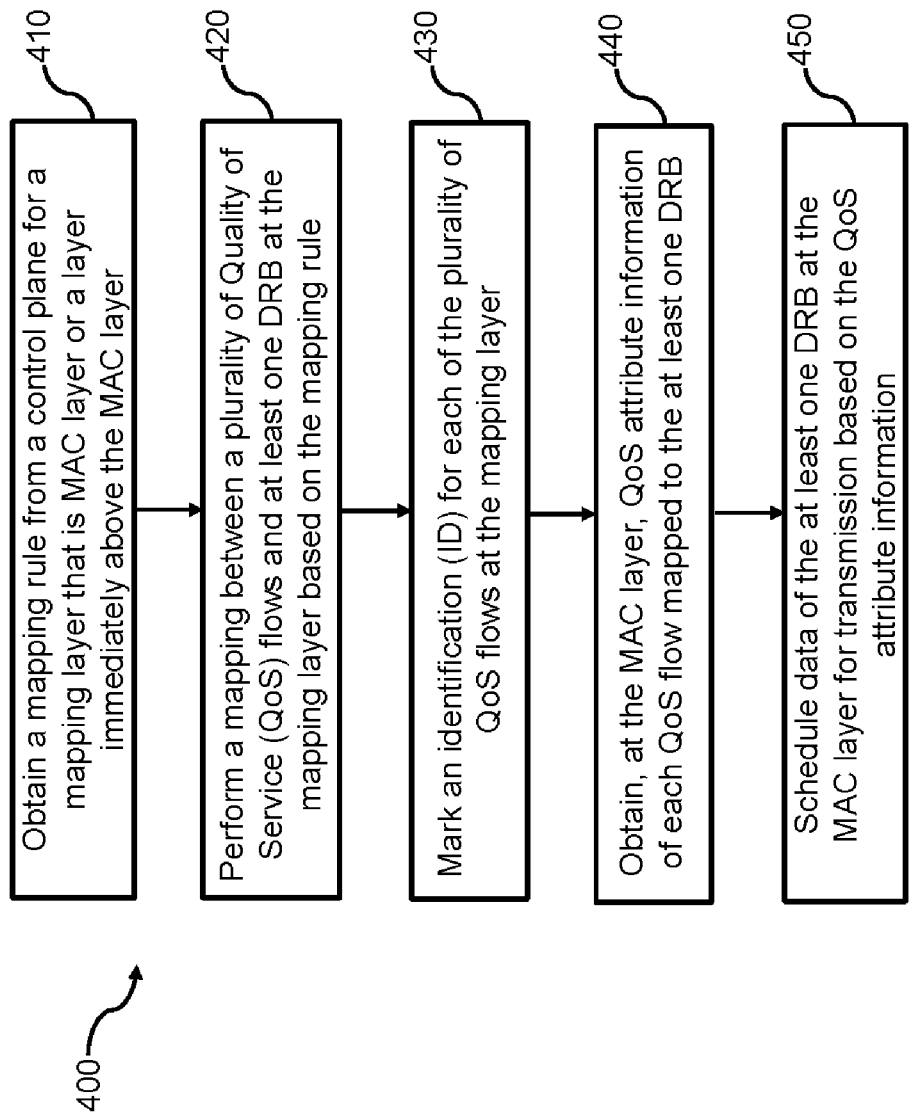
FIG. 4 illustrates a flow chart for a method performed by a BS for data mapping and scheduling, in accordance with some embodiments of the present disclosure.

FIG. 4 illustrates a flow chart for a method 400 performed by a BS, e.g. the BS 300 in FIG. 3, for data mapping and scheduling, in accordance with some embodiments of the present disclosure. At operation 410, a mapping rule is obtained from a control plane for a mapping layer that is MAC layer or a layer immediately above the MAC layer. At operation 420, a mapping is performed between a plurality of Quality of Service (QoS) flows and at least one DRB at the mapping layer based on the mapping rule. At operation 430, an identification (ID) is marked for each of the plurality of QoS flows at the mapping layer. At operation 440, the BS obtains, at the MAC layer, QoS attribute information of each QoS flow mapped to the at least one DRB. At operation 450, the BS schedules data of the at least one DRB at the MAC layer for transmission based on the QoS attribute information. The order of the operations shown in FIG. 4 may be changed according to different embodiments of the present disclosure.

Figure 5:
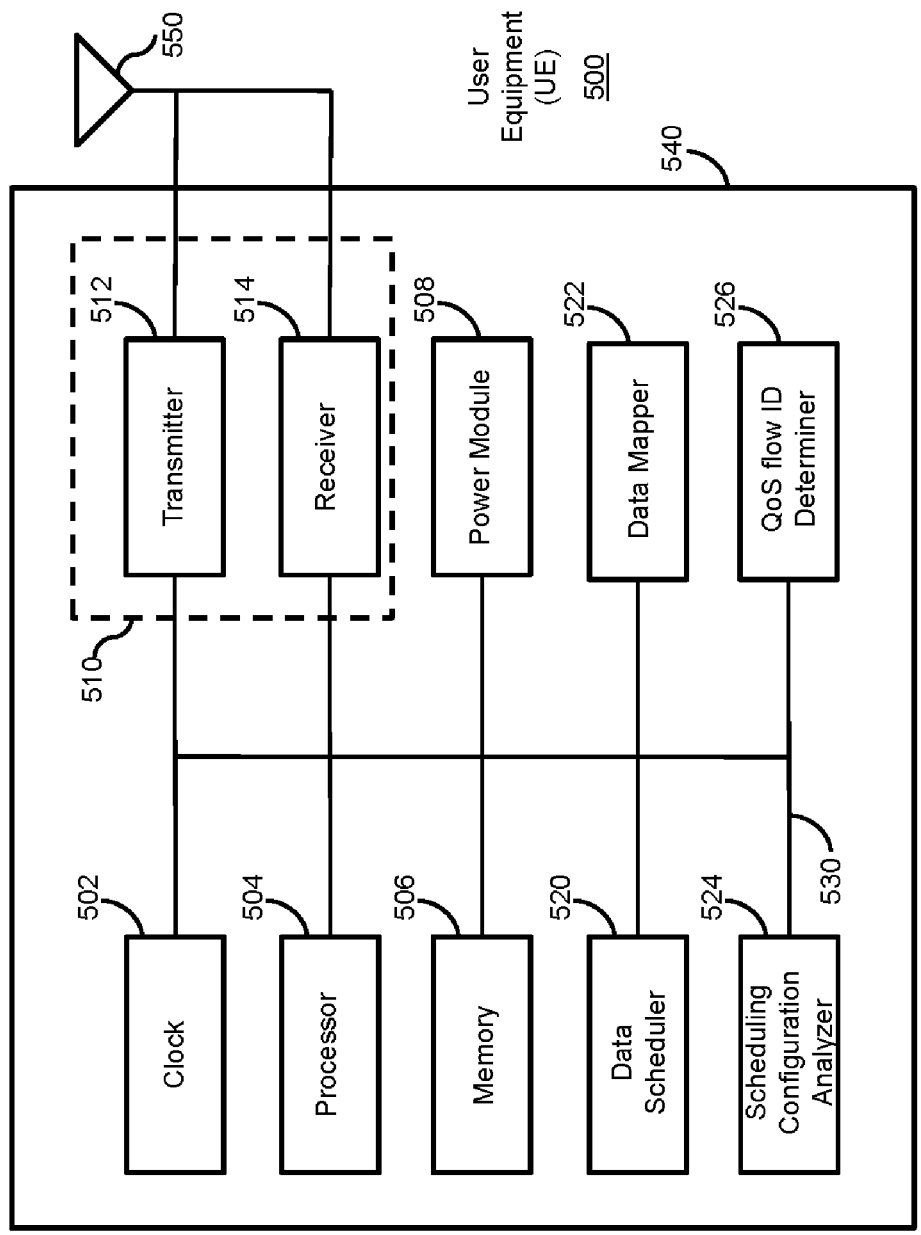
FIG. 5 illustrates a block diagram of a user equipment (UE), in accordance with some embodiments of the present disclosure.

FIG. 5 illustrates a block diagram of a user equipment (UE) 500, in accordance with some embodiments of the present disclosure. The UE 500 is an example of a device that can be configured to implement the various methods described herein. As shown in FIG. 5, the UE 500 includes a housing 540 containing a system clock 502, a processor 504, a memory 506, a transceiver 510 comprising a transmitter 512 and a receiver 514, a power module 508, a data scheduler 520, a data mapper 522, a scheduling configuration analyzer 524, and a QoS flow identification (ID) determiner 526.

In this embodiment, the system clock 502, the processor 504, the memory 506, the transceiver 510 and the power module 508 work similarly to the system clock 302, the processor 304, the memory 306, the transceiver 310 and the power module 308 in the BS 300. An antenna 550 or a multi-antenna array 550 is typically attached to the housing 540 and electrically coupled to the transceiver 510.

In a communication system, the UE 500 may want to transmit uplink data to a BS based on data scheduling. In one embodiment, the data scheduler 520 may schedule data of at least one data radio bearer (DRB) at a first layer, e.g. a medium access control (MAC) layer. The data mapper 522 in this example may perform a mapping between a plurality of Quality of Service (QoS) flows and the at least one DRB at a mapping layer that is the first layer or a second layer immediately above the first layer. For example, the second layer may be a radio link control (RLC) layer.

In one embodiment, the data mapper 522 may obtain, at the mapping layer, a mapping rule from the BS. Based on the mapping rule, the data mapper 522 may map the plurality of QoS flows to the at least one DRB for data transmission between the BS and the UE 500.

In one embodiment, the scheduling configuration analyzer 524 may obtain, at the first layer, a scheduling configuration from the BS. In one example, the scheduling configuration is determined based on QoS attribute information of each QoS flow to be mapped to the at least one DRB. The QoS attribute information comprises at least one of: an aggregated DRB QoS profile; a QoS flow profile; and a QoS requirement of each QoS flow mapped to the at least one DRB. The scheduling configuration analyzer 524 may send the scheduling configuration to the data scheduler 520, which can schedule the data of the at least one DRB based on the scheduling configuration.

In one embodiment, the QoS flow ID determiner 526 may determine and mark an identification (ID) for each of the plurality of QoS flows at the mapping layer. The processor 504 in this example may process data at a layer above the second layer with a granularity of at least one of: a QoS flow and a protocol data unit (PDU) session.

The various modules discussed above are coupled together by a bus system 530. The bus system 530 can include a data bus and, for example, a power bus, a control signal bus, and/or a status signal bus in addition to the data bus. It is understood that the modules of the UE 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the data mapper 522. Conversely, each of the modules illustrated in FIG. 5 can be implemented using a plurality of separate components or elements.

Figure 6:
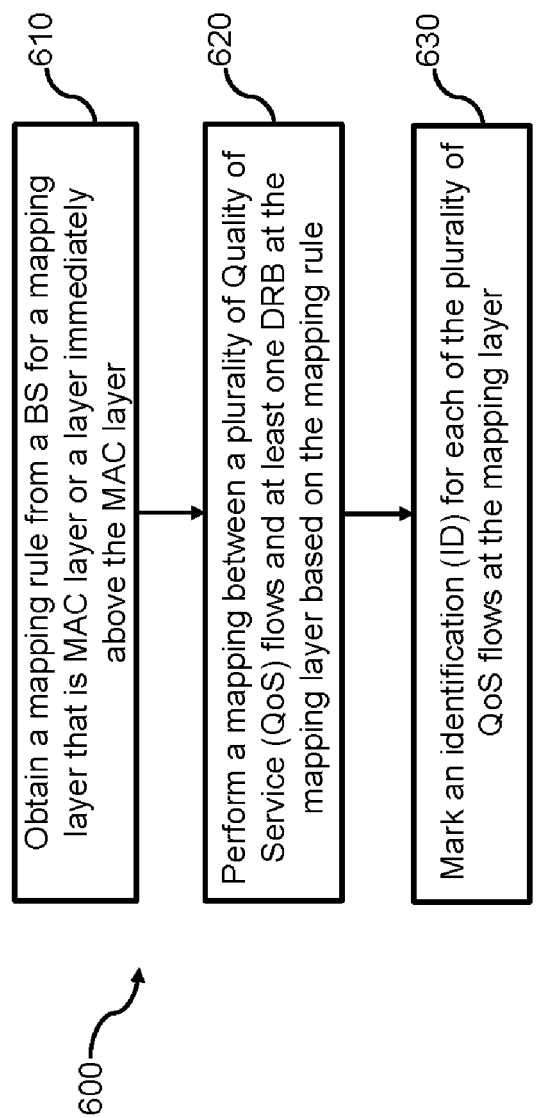
FIG. 6 illustrates a flow chart for a method performed by a UE for data mapping and scheduling, in accordance with some embodiments of the present disclosure.

FIG. 6 illustrates a flow chart for a method 600 performed by a UE, e.g. the UE 500 in FIG. 5, for data mapping and scheduling, in accordance with some embodiments of the present disclosure. At operation 610, a mapping rule is obtained from a BS for a mapping layer that is MAC layer or a layer immediately above the MAC layer. At operation 620, a mapping is performed between a plurality of Quality of Service (QoS) flows and at least one DRB at the mapping layer based on the mapping rule. At operation 630, an identification (ID) is marked for each of the plurality of QoS flows at the mapping layer. The order of the operations shown in FIG. 6 may be changed according to different embodiments of the present disclosure.

Different embodiments of the present disclosure will now be described in detail hereinafter. It is noted that the features of the embodiments and examples in the present disclosure may be combined with each other in any manner without conflict.

In a first embodiment, data transmission is performed where the MAC+1 layer is responsible for a mapping function. In this embodiment, the MAC layer of the protocol stack is responsible for scheduling and concatenating; the MAC+1 layer is responsible for mapping of QoS flows to the data bearer DRB; the MAC+2 layer is responsible for automatic repeat request (ARQ) functions; and the MAC+3 layer is responsible for order preservation, robust header compression (RoHC), ciphering, and integrity protection (e.g. by a first algorithm for protecting the data integrity) functions.

Figure 7:
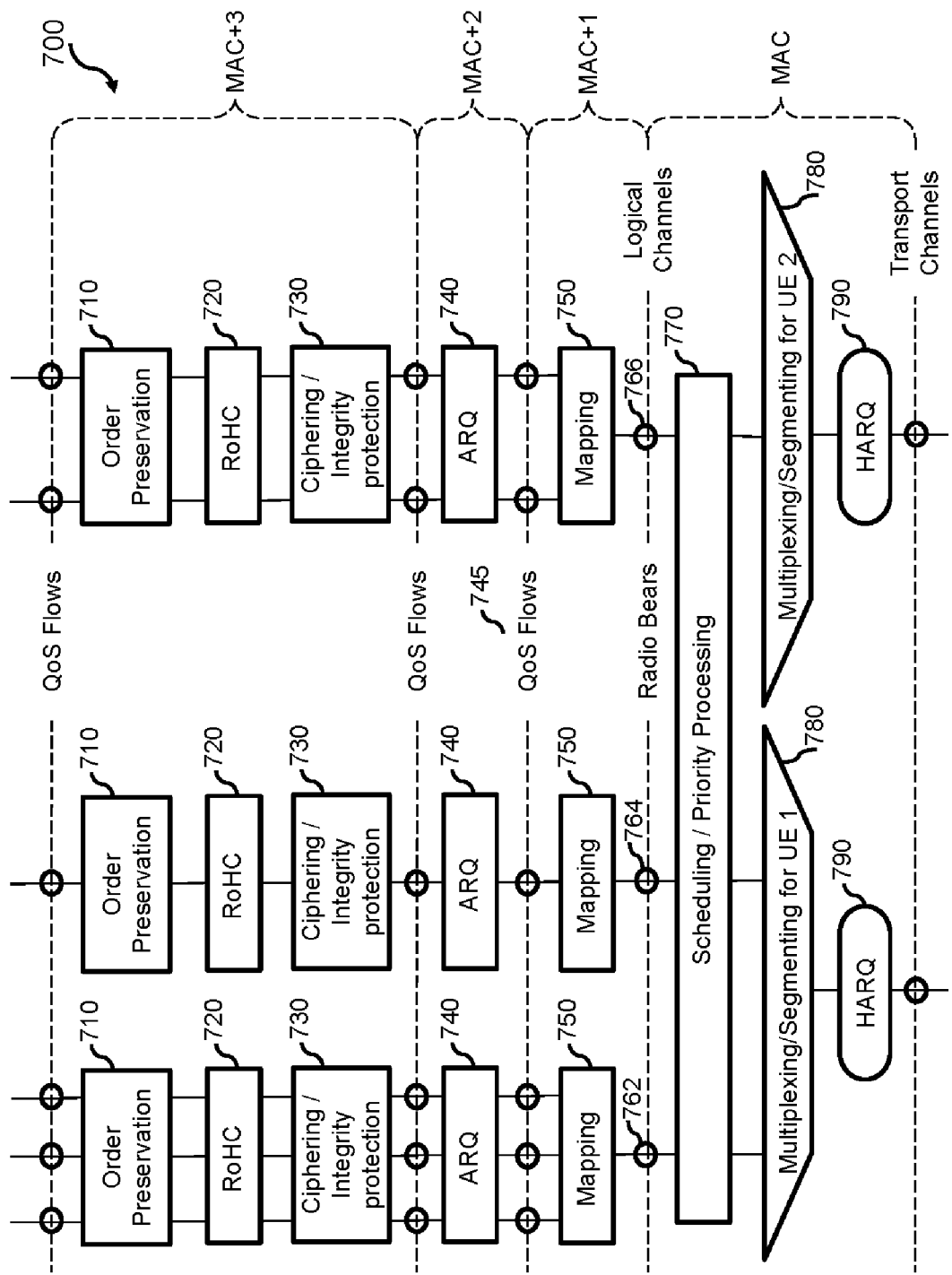
FIG. 7 illustrates an exemplary layer 2 structure for downlink data transmission with a data mapping layer that is immediately above a medium access control (MAC) layer, in accordance with some embodiments of the present disclosure.

FIG. 7 illustrates an exemplary layer 2 structure 700 for downlink data transmission with a data mapping layer that is immediately above a medium access control (MAC) layer, in accordance with the first embodiment. An exemplary downlink transmission according to the first embodiment may comprise the following steps.

In Step 1, the MAC+3 layer on the network side receives the QoS flows data packet from the core network via Ng interface. The MAC+3 layer may perform order preservation 710, e.g. by sequence number (SN) numbering, robust header compression (RoHC) 720, ciphering and integrity protection 730, sub-head adding on the data packets in each flow to form MAC+3 PDUs. The MAC+3 layer forwards the MAC+3 PDUs to the MAC+2 layer.

In Step 2, the MAC+2 layer on the network side receives the MAC+2 SDUs sent from the MAC+3 layer. For data packets in each flow, the MAC+2 layer adds the SN numbering to the data packets, performs ARQ 740 on the data packets, and adds sub-headers to the data packets, to form the MAC+2 PDUs. The MAC+2 layer forwards the MAC+2 PDUs to the MAC+1 layer.

In Step 3, the MAC+1 layer on the network side receives each QoS flows data packet from the MAC+2 layer. The MAC+1 layer establishes corresponding DRBs according to the QoS requirements based on control plane configuration of the network side. According to a mapping rule configured by the network side control plane, the MAC+1 layer maps at operation 750 the QoS flows 745 to the DRBs 762, 764, 766 and marks QoS flow ID (QFI) on each QoS flow. One or more QoS flows may be mapped to a same DRB. For example, three QoS flows are mapped to the DRB 762; two QoS flows are mapped to the DRB 766; and one QoS flow is mapped to the DRB 764. The MAC+1 layer sends the mapped DRBs to the MAC layer through the logical channel.

In Step 4, the MAC layer on the network side obtains the data information of each DRB from the logical channel. The MAC layer performs scheduling and/or priority processing 770 based on the QoS flow profile and the aggregated DRB QoS profile configured by the control plane of the base station. Then, the MAC layer performs segmentation and multiplexing 780, and assembles transport blocks (TBs) for each UE to which the downlink data is sent. The MAC layer also performs HARQ processing 790 for each UE, according to the scheduling result. The MAC layer sends the corresponding TBs to the PHY layer.

In Step 5, the PHY layer performs the corresponding physical layer processing. Then the PHY layer transmits downlink data to the terminal via air interface.

In Step 6, the PHY layer on the terminal side receives the downlink data sent by the network side through the air interface, and performs PHY layer processing. Then, the PHY layer of the terminal side delivers the processed TBs to the MAC layer on the terminal side.

In Step 7, the MAC layer on the terminal side receives the MAC PDUs from the PHY layer, and performs de-multiplexing, reassembling, and HARQ processing to form MAC SDUs. The MAC layer sends the MAC SDUs to the MAC+1 layer through the logical channel.

In Step 8, the MAC+1 layer on the terminal side performs de-mapping of the DRB to QoS flows for each logical channel DRB according to the QoS mapping rule configured by the network side control plane via radio resource control (RRC) signaling. The MAC+1 layer reads the QFI information of each QoS flow, and sends the QoS flow data packet to the MAC+2 layer.

In Step 9, the MAC+2 layer on the terminal side performs ARQ processing on each QoS flow data packet. The MAC+2 layer then sends the data packet to the MAC+3 layer.

In Step 10, the MAC+3 layer on the terminal side performs deciphering, integrity preservation resolving (e.g. by a second algorithm that is inverse to the first algorithm), RoHC, and data reordering, on each QoS flow packet. Then, the MAC+3 layer may send the data packet to an upper layer.

When the MAC layer on the network side receives the configuration information aggregated DRB QoS profile of the network side control plane, if the MAC layer finds out that the required QoS performance cannot be met through scheduling, the MAC layer may reject the configuration of the control plane and request the control plane to reconfigure. After receiving the rejection information, the network side control plane can notify the core network of the rejection information through the Ng interface.

On the network side, the MAC+2 layer and the MAC+1 layer can be deployed separately. That is, there may be an interface between the MAC+2 layer and the MAC+1 layer. In the downlink data processing, the MAC+2 layer data packet must be processed by the interface before being sent to the MAC+1 layer. In this case, the control plane function may be deployed near the MAC+1 layer or the MAC layer. For example, in the case of the CU-DU separation as shown in FIG. 2, the control plane function is deployed on the DU side. Compared to existing NR approach, the mapping function of the QoS flows packet to the DRBs is deployed in the MAC+1 layer in this embodiment, so that both the control plane function and the mapping function can be closely combined with the MAC layer scheduling function.

On the one hand, this combined design can avoid the cross-layer interaction caused by the separate deployment of the control plane, the mapping layer and the MAC layer in the NR system. This may especially avoid the delay and low efficient interaction between the CU and the DU. On the other hand, the control plane can obtain resource usage and air interface transmission information from the MAC layer in time, including: actual air interface transmission efficiency on the DU side, physical resource utilization rate, scheduling efficiency of the MAC layer, etc. Based on these information, the mapping rules for mapping QoS flows packets to DRBs may be modified in real time to ensure the rationality of the mapping, thereby largely avoiding the situation that the MAC layer refuses the mapping configuration of the control plane because it cannot meet the QoS requirements. At the same time, the MAC layer can also obtain the QoS attribute information of each flow mapped to the DRBs from the control plane in time, and performs scheduling based on the QoS attribute information to satisfy the QoS performance requirements of each flow to the greatest extent. As such, the user can obtain a better performance service experience. In addition, the scheduling of DRBs at the MAC layer can also be based on the QoS requirements of each flow mapped to the DRBs, As the mapping function is deployed at the MAC+1 layer on the network side, the processing granularity of the MAC+2 layer and the MAC+3 layer above the MAC+1 layer may be at the level of QoS flows or PDU sessions, which can be the same on the terminal side.

Figure 8:
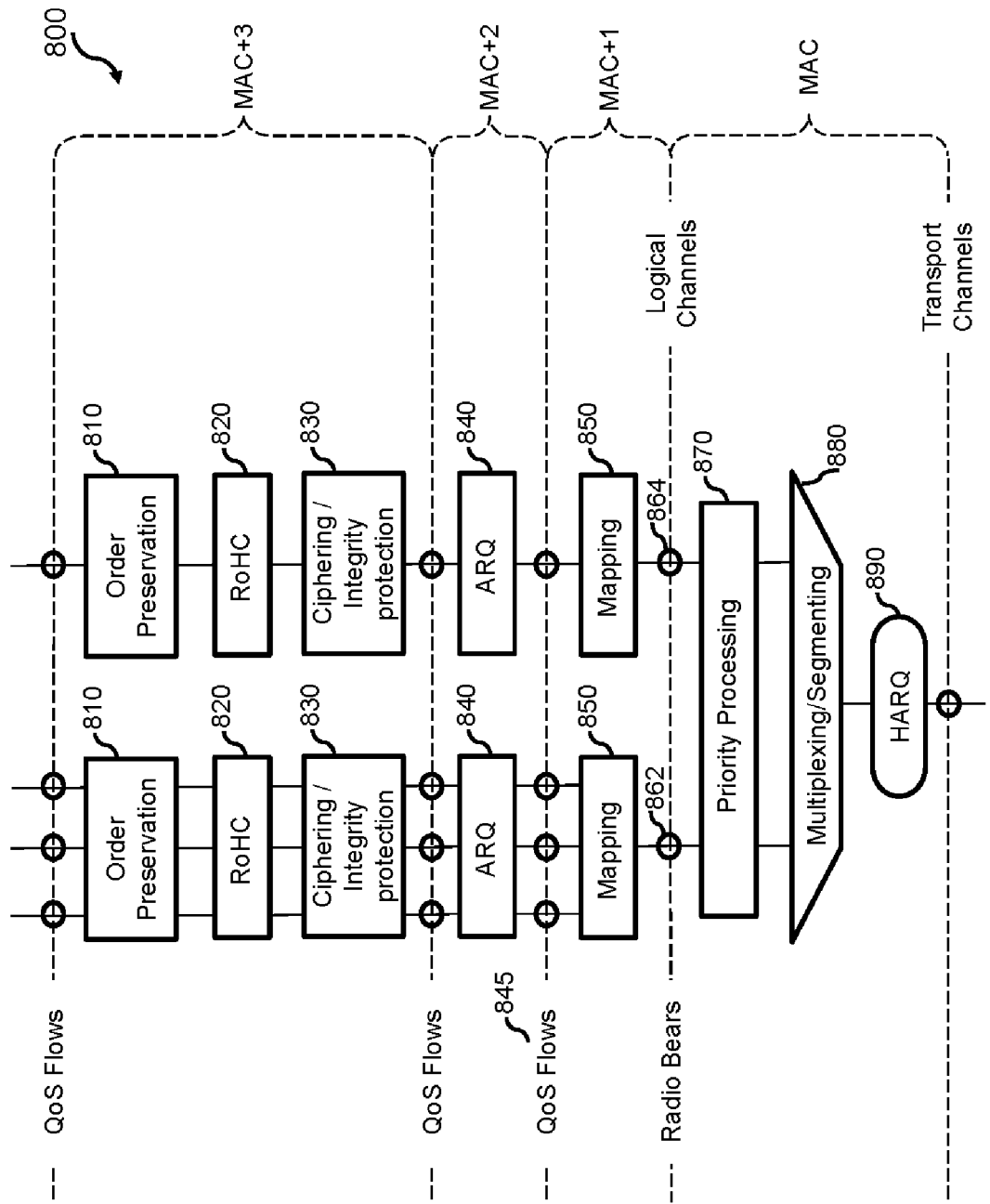
FIG. 8 illustrates an exemplary layer 2 structure for uplink data transmission with a data mapping layer that is immediately above a MAC layer, in accordance with some embodiments of the present disclosure.

FIG. 8 illustrates an exemplary layer 2 structure 800 for uplink data transmission with a data mapping layer that is immediately above a MAC layer, in accordance with the first embodiment. An exemplary uplink transmission according to the first embodiment may comprise the following steps.

In Step 1, the MAC+3 layer on the terminal side receives the QoS flows data packet from the upper layer. The MAC+3 layer may perform order preservation 810, robust header compression (RoHC) 820, ciphering and integrity protection 830, and/or SN numbering, sub-head processing on the data packets in each flow to form MAC+3 PDUs. The MAC+3 layer forwards the MAC+3 PDUs to the MAC+2 layer.

In Step 2, the MAC+2 layer on the terminal side receives the MAC+2 SDUs sent from the MAC+3 layer. For data packets in each flow, the MAC+2 layer adds the SN to the data packets, performs ARQ 840 on the data packets, and adds sub-headers to the data packets, to form the MAC+2 PDUs. The MAC+2 layer forwards the MAC+2 PDUs to the MAC+1 layer.

In Step 3, the MAC+1 layer on the terminal side receives each QoS flows data packet from the MAC+2 layer. The MAC+1 layer establishes corresponding DRBs. According to a QoS mapping rule configured by the network side control plane via radio resource control (RRC) signaling, the MAC+1 layer maps at operation 850 the QoS flows 845 to the DRBs 862, 864 and may mark QoS flow ID (QFI) on each QoS flow. One or more QoS flows may be mapped to a same DRB. For example, three QoS flows are mapped to the DRB 862; and one QoS flow is mapped to the DRB 864. The MAC+1 layer sends the mapped DRBs to the MAC layer through the logical channel.

In Step 4, the MAC layer on the terminal side obtains the data information of each DRB from the logical channel. The MAC layer performs priority processing 870 on each logical channel data according to the uplink scheduling result of the base station. Then, the MAC layer performs segmentation and multiplexing 880, and assembles transport blocks (TBs). The MAC layer also performs HARQ processing 890 according to the scheduling result. The MAC layer sends the corresponding TBs to the PHY layer.

In Step 5, the PHY layer performs the corresponding physical layer processing. Then the PHY layer transmits the uplink data to the network side via air interface.

In Step 6, the PHY layer on the network side receives the uplink data sent by the terminal side through the air interface, and performs PHY layer processing. Then, the PHY layer of the network side delivers the processed TBs to the MAC layer on the network side.

In Step 7, the MAC layer on the network side receives the MAC PDUs from the PHY layer, and performs de-multiplexing, reassembling, and HARQ processing to form MAC SDUs. The MAC layer sends the MAC SDUs to the MAC+1 layer through the logical channel.

In Step 8, the MAC+1 layer on the network side performs de-mapping of the DRB to QoS flows for each logical channel DRB. The MAC+1 layer marks the QFI information for each QoS flow, and sends the QoS flow data packet to the MAC+2 layer.

In Step 9, the MAC+2 layer on the network side performs ARQ processing on each QoS flow data packet. The MAC+2 layer then sends the data packet to the MAC+3 layer.

In Step 10, the MAC+3 layer on the network side performs deciphering, integrity preservation resolving, RoHC, and data reordering, on each QoS flow packet. Then, the MAC+3 layer may send the data packet to the core network.

On the network side, the MAC+2 layer and the MAC+1 layer can be deployed separately. That is, there may be an interface between the MAC+2 layer and the MAC+1 layer. In the uplink data processing, the MAC+2 layer data packet must be processed by the interface before being sent to the MAC+1 layer. In this case, the control plane function may be deployed near the MAC+1 layer or the MAC layer. For example, in the case of the CU-DU separation as shown in FIG. 2, the control plane function is deployed on the DU side. Compared to existing NR approach, the mapping function of the QoS flows packet to the DRBs is deployed in the MAC+1 layer in this embodiment, so that both the control plane function and the mapping function can be closely combined with the MAC layer scheduling function.

As the mapping function is deployed at the MAC+1 layer on the terminal side, the processing granularity of the MAC+2 layer and the MAC+3 layer above the MAC+1 layer may be at the level of QoS flows or PDU sessions, which may be the same on the network side.

In a second embodiment, data transmission is performed where the MAC layer is responsible for a mapping function. In this embodiment, the MAC layer of the protocol stack is responsible for mapping of QoS flows to the data bearer DRB, scheduling, and concatenation; the MAC+1 layer is responsible ARQ functions; and the MAC+2 layer is responsible for order preservation, robust header compression (RoHC), ciphering, and integrity protection (e.g. by a first algorithm for protecting the data integrity) functions. In another embodiment, one or more of the functions in the MAC+2 layer above can be moved to the MAC+3 layer.

Figure 9:
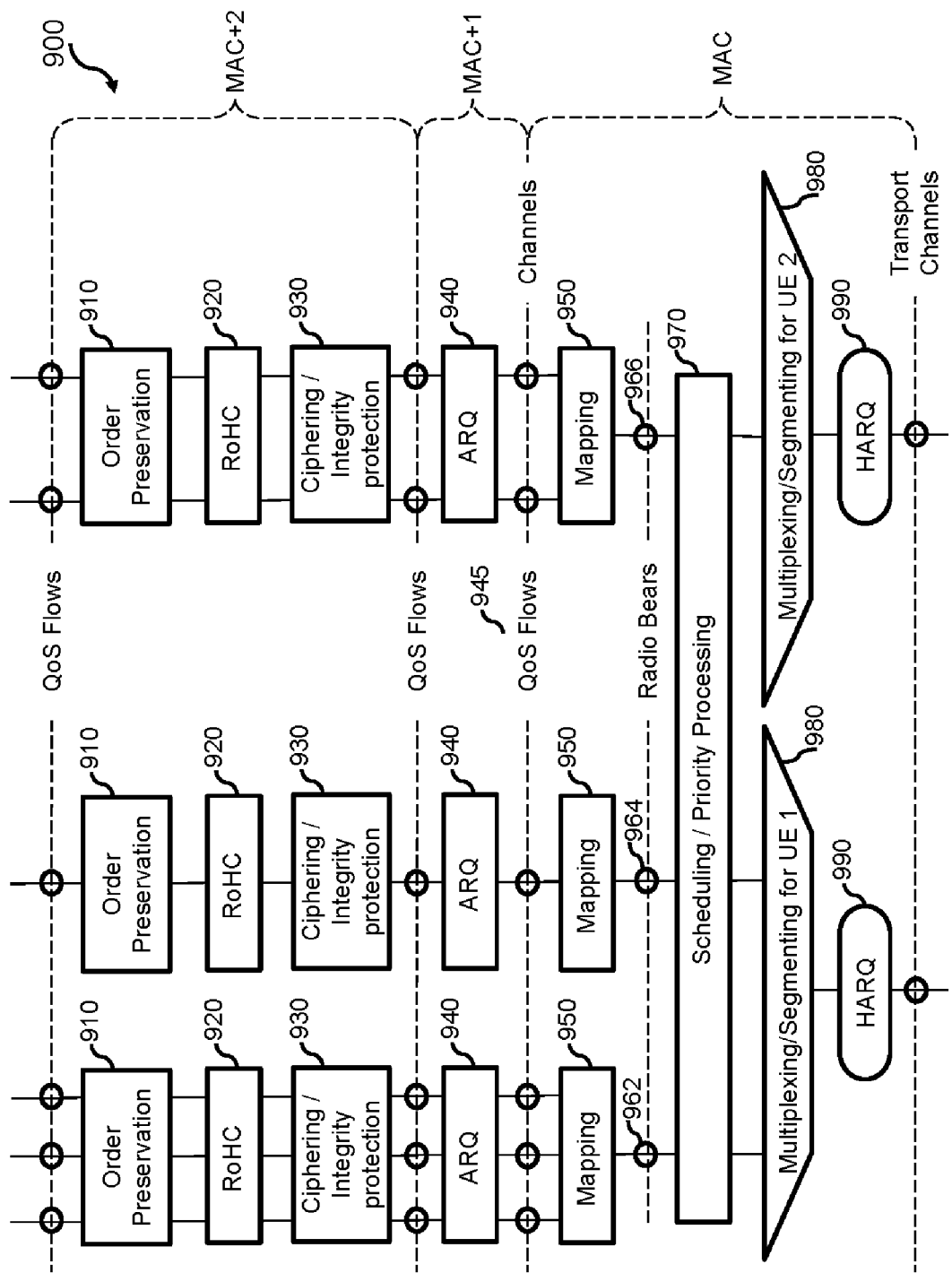
FIG. 9 illustrates an exemplary layer 2 structure for downlink data transmission with a data mapping layer being a MAC layer, in accordance with some embodiments of the present disclosure.

FIG. 9 illustrates an exemplary layer 2 structure 900 for downlink data transmission with a data mapping layer being a MAC layer, in accordance with the second embodiment. Compared to the downlink data transmission process in which the MAC+1 layer is responsible for the mapping function in the first embodiment, the difference is that the mapping function is performed at the MAC layer in the second embodiment. The mapping related processing is performed at the MAC layer; the mapping function and the scheduling function are performed in the same protocol layer.

As shown in FIG. 9, the MAC+2 layer on the network side receives the QoS flows data packet from the core network via Ng interface. The MAC+2 layer may perform order preservation 910, e.g. by sequence number (SN) numbering, robust header compression (RoHC) 920, ciphering and integrity protection 930, sub-head adding on the data packets in each flow to form MAC+2 PDUs. The MAC+2 layer forwards the MAC+2 PDUs to the MAC+1 layer.

The MAC+1 layer on the network side receives the MAC+2 SDUs sent from the MAC+2 layer. For data packets in each flow, the MAC+1 layer adds the SN numbering to the data packets, performs ARQ 940 on the data packets, and adds sub-headers to the data packets, to form the MAC+1 PDUs. The MAC+1 layer forwards the MAC+1 PDUs to the MAC layer.

The MAC layer on the network side receives each QoS flows data packet from the MAC+1 layer. The MAC layer establishes corresponding DRBs according to the QoS requirements based on control plane configuration of the network side. According to a mapping rule configured by the network side control plane, the MAC layer maps at operation 950 the QoS flows 945 to the DRBs 962, 964, 966 and marks QoS flow ID (QFI) on each QoS flow. One or more QoS flows may be mapped to a same DRB. For example, three QoS flows are mapped to the DRB 962; two QoS flows are mapped to the DRB 966; and one QoS flow is mapped to the DRB 964. The MAC layer performs scheduling and/or priority processing 970 based on the QoS flow profile and the aggregated DRB QoS profile configured by the control plane of the base station. Then, the MAC layer performs segmentation and multiplexing 980, and assembles transport blocks (TBs) for each UE to which the downlink data is sent. The MAC layer also performs HARQ processing 990 for each UE, according to the scheduling result. The MAC layer sends the corresponding TBs to the PHY layer.

The PHY layer performs the corresponding physical layer processing. Then the PHY layer transmits downlink data to the terminal via air interface.

The PHY layer on the terminal side receives the downlink data sent by the network side through the air interface, and performs PHY layer processing. Then, the PHY layer of the terminal side delivers the processed TBs to the MAC layer on the terminal side.

The MAC layer on the terminal side receives the MAC PDUs from the PHY layer, and performs de-multiplexing, reassembling, and HARQ processing to form MAC SDUs. The MAC layer on the terminal side also performs de-mapping of the DRB to QoS flows for each logical channel DRB according to the QoS mapping rule configured by the network side control plane via radio resource control (RRC) signaling. The MAC layer reads the QFI information of each QoS flow, and sends the QoS flow data packet to the MAC+1 layer.

The MAC+1 layer on the terminal side performs ARQ processing on each QoS flow data packet. The MAC+1 layer then sends the data packet to the MAC+2 layer.

The MAC+2 layer on the terminal side performs deciphering, integrity preservation resolving (e.g. by a second algorithm that is inverse to the first algorithm), RoHC, and data reordering, on each QoS flow packet. Then, the MAC+2 layer may send the data packet to an upper layer.

Figure 10:
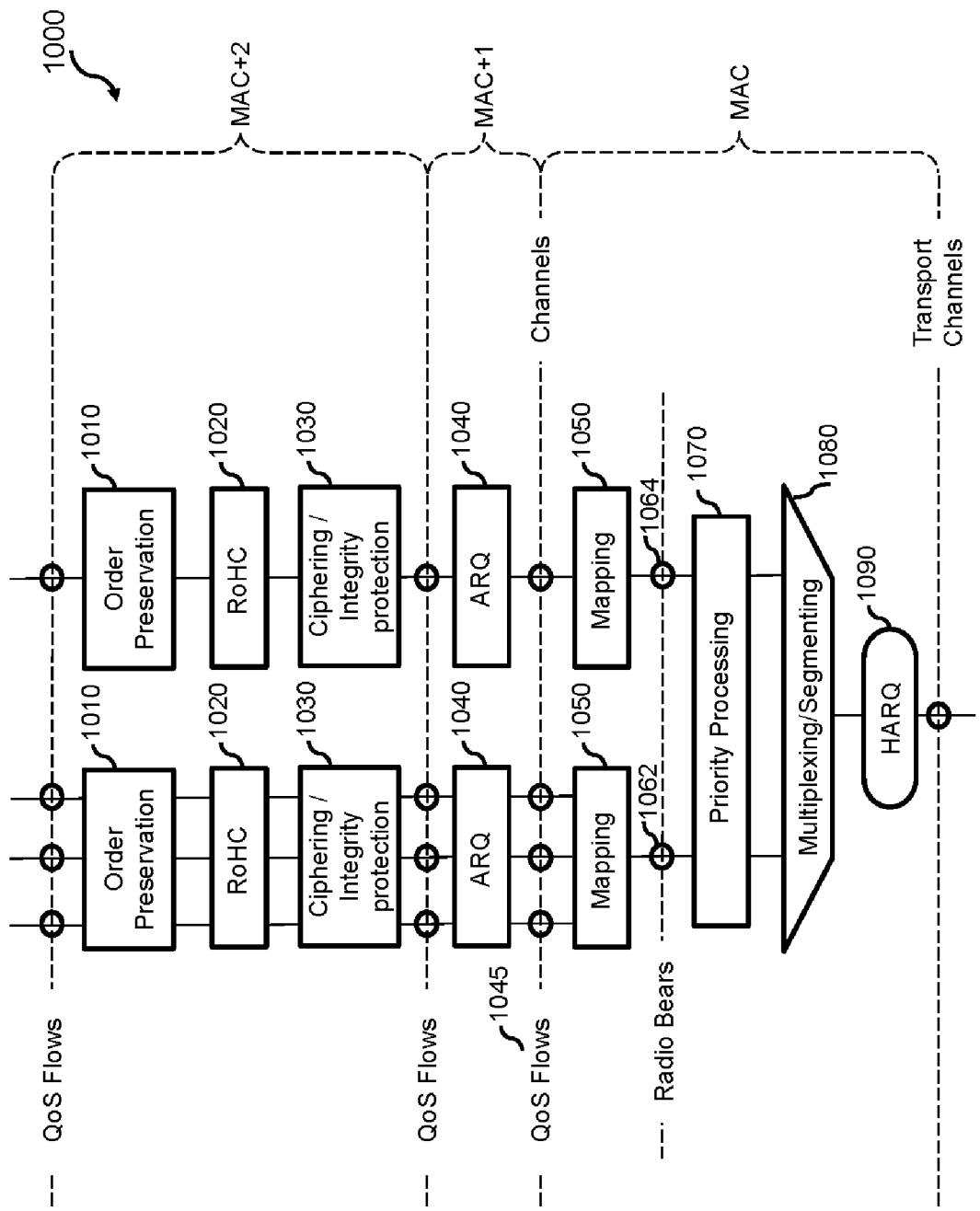
FIG. 10 illustrates an exemplary layer 2 structure for uplink data transmission with a data mapping layer being a MAC layer, in accordance with some embodiments of the present disclosure.

FIG. 10 illustrates an exemplary layer 2 structure 1000 for uplink data transmission with a data mapping layer being a MAC layer, in accordance with some embodiments of the present disclosure. Compared to the uplink data transmission process in which the MAC+1 layer is responsible for the mapping function in the first embodiment, the difference is that the mapping function is performed at the MAC layer in the second embodiment. The mapping related processing is performed at the MAC layer; the mapping function and the scheduling function are performed in the same protocol layer.

As shown in FIG. 10, the MAC+2 layer on the terminal side receives the QoS flows data packet from the upper layer. The MAC+2 layer may perform order preservation 1010, robust header compression (RoHC) 1020, ciphering and integrity protection 1030, and/or SN numbering, sub-head processing on the data packets in each flow to form MAC+2 PDUs. The MAC+2 layer forwards the MAC+2 PDUs to the MAC+1 layer.

The MAC+1 layer on the terminal side receives the MAC+2 SDUs sent from the MAC+2 layer. For data packets in each flow, the MAC+1 layer adds the SN to the data packets, performs ARQ 1040 on the data packets, and adds sub-headers to the data packets, to form the MAC+1 PDUs. The MAC+1 layer forwards the MAC+1 PDUs to the MAC layer.

The MAC layer on the terminal side receives each QoS flows data packet from the MAC+1 layer. The MAC layer establishes corresponding DRBs. According to a QoS mapping rule configured by the network side control plane via radio resource control (RRC) signaling, the MAC layer maps at operation 1050 the QoS flows 1045 to the DRBs 1062, 1064 and may mark QoS flow ID (QFI) on each QoS flow. One or more QoS flows may be mapped to a same DRB. For example, three QoS flows are mapped to the DRB 1062; and one QoS flow is mapped to the DRB 1064. The MAC layer also performs priority processing 1070 on each logical channel data according to the uplink scheduling result of the base station. Then, the MAC layer performs segmentation and multiplexing 1080, and assembles transport blocks (TBs). The MAC layer also performs HARQ processing 1090 according to the scheduling result. The MAC layer sends the corresponding TBs to the PHY layer.

The PHY layer performs the corresponding physical layer processing. Then the PHY layer transmits the uplink data to the network side via air interface.

The PHY layer on the network side receives the uplink data sent by the terminal side through the air interface, and performs PHY layer processing. Then, the PHY layer of the network side delivers the processed TBs to the MAC layer on the network side.

The MAC layer on the network side receives the MAC PDUs from the PHY layer, and performs de-multiplexing, reassembling, and HARQ processing to form MAC SDUs. The MAC layer on the network side also performs de-mapping of the DRB to QoS flows for each logical channel DRB. The MAC layer marks the QFI information for each QoS flow, and sends the QoS flow data packet to the MAC+1 layer.

The MAC+1 layer on the network side performs ARQ processing on each QoS flow data packet. The MAC+1 layer then sends the data packet to the MAC+2 layer.

The MAC+2 layer on the network side performs deciphering, integrity preservation resolving, RoHC, and data reordering, on each QoS flow packet. Then, the MAC+2 layer may send the data packet to the core network.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication module in a distributed unit (DU), the method comprising:
   scheduling data of at least one data radio bearer (DRB) at a first layer implemented at the DU;
   performing a mapping between a plurality of uplink (UL) or downlink (DL) Quality of Service (QOS) flow packets and the at least one DRB at a mapping layer that is the first layer or a second layer, implemented at the DU, immediately above the first layer;
   marking, at the mapping layer, a QoS flow ID (QFI) for each DL and UL QoS flow packet;
   obtaining, at the first layer, QoS attribute information of each QoS flow mapped to the at least one DRB, wherein the data of the at least one DRB is scheduled based on the QoS attribute information, wherein the QoS attribute information comprises at least one of: an aggregated DRB QoS profile, a QoS flow profile, or a QoS requirement of each QoS flow mapped to the at least one DRB;
   obtaining, at the mapping layer, a mapping rule from a control plane for the mapping between the plurality of QoS flows and the at least one DRB, wherein the mapping is performed based on the mapping rule; and
   processing data at a layer above the second layer with a granularity of at least one of: a QoS flow or a protocol data unit (PDU) session.

2. The method of claim 1, wherein the first layer is a medium access control (MAC) layer.

3. The method of claim 2, wherein the second layer is a radio link control (RLC) layer.

4. The method of claim 1, further comprising:
   adjusting the mapping rule in real time based on information obtained from the first layer.

5. The method of claim 1, wherein at least one layer above the second layer is implemented at a Central Unit (CU) of the split-architecture network.

6. A non-transitory computer-readable medium having stored thereon computer-executable instructions which when executed by at least one processor, cause the at least one processor to carry out the method of claim 1.

7. A method performed by a wireless communication device, the method comprising:
   obtaining scheduling information for at least one data radio bearer (DRB) at a first layer;
   performing a mapping between a plurality of uplink (UL) or downlink (DL) Quality of Service (QOS) flow packets and the at least one DRB at a mapping layer that is the first layer or a second layer immediately above the first layer;

marking at the mapping layer a QoS flow ID (QFI) for each DL and UL QoS flow packet;

obtaining, at the first layer, QOS attribute information of each QoS flow mapped to the at least one DRB, wherein the data of the at least one DRB is scheduled based on the QoS attribute information, wherein the QoS attribute information comprises at least one of: an aggregated DRB QoS profile, a QoS flow profile, or a QoS requirement of each QoS flow mapped to the at least one DRB;

obtaining, at the mapping layer, a mapping rule from a wireless communication module, wherein the mapping is performed based on the mapping rule for data transmission between the wireless communication module and the wireless communication device; and processing data at a layer above the second layer with a granularity of at least one of: a QoS flow or a protocol data unit (PDU) session.

8. The method of claim 7, wherein the first layer is a medium access control (MAC) layer.

9. The method of claim 8, wherein the second layer is a radio link control (RLC) layer.

10. The method of claim 7, wherein the mapping rule is adjusted in real time by the wireless communication module based on information obtained from a medium access control (MAC) layer of the wireless communication module.

11. A wireless communication device, comprising:
at least one processor configured to carry out the method of claim 7.

12. A wireless communication module in a distributed unit (DU), comprising:
at least one processor configured to:
schedule data of at least one data radio bearer (DRB) at a first layer implemented at the DU;

perform a mapping between a plurality of uplink (UL) or downlink (DL) Quality of Service (QOS) flow packets and the at least one DRB at a mapping layer that is the first layer or a second layer, implemented at the DU, immediately above the first layer;

mark, at the mapping layer, a QoS flow ID (QFI) for each DL and UL QoS flow packet;

obtain, at the first layer, QoS attribute information of each QoS flow mapped to the at least one DRB, wherein the data of the at least one DRB is scheduled based on the QoS attribute information, wherein the QoS attribute information comprises at least one of: an aggregated DRB QoS profile, a QoS flow profile, or a QoS requirement of each QoS flow mapped to the at least one DRB;

obtain, at the mapping layer, a mapping rule from a wireless communication module, wherein the mapping is performed based on the mapping rule for data transmission between the wireless communication module and the wireless communication device; and process data at a layer above the second layer with a granularity of at least one of: a QoS flow or a protocol data unit (PDU) session.

* * * * *